US009953479B1

(12) United States Patent
Sawant et al.

(10) Patent No.: US 9,953,479 B1
(45) Date of Patent: Apr. 24, 2018

(54) CONTROLLING ACCESS TO PHYSICAL COMPARTMENT USING MOBILE DEVICE AND TRANSACTION AUTHENTICATION SYSTEM

(71) Applicant: CA, Inc., New York, NY (US)

(72) Inventors: Yashwant Ramkishan Sawant, Parbhani (IN); Banisetti Sandeep, Srikakulam (IN); Mohammed Mujeeb Kaladgi, Bangalore (IN); Ruqiya Nikhat Kaladgi, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 15/461,982

(22) Filed: Mar. 17, 2017

(51) Int. Cl.
  *G07C 9/00* (2006.01)
  *H04L 29/06* (2006.01)
  *H04W 12/06* (2009.01)
  *G06Q 20/40* (2012.01)
  *G06Q 20/38* (2012.01)

(52) U.S. Cl.
  CPC ..... *G07C 9/00912* (2013.01); *G06Q 20/3829* (2013.01); *G06Q 20/40* (2013.01); *G07C 9/00015* (2013.01); *G07C 9/00309* (2013.01); *H04L 63/0428* (2013.01); *H04W 12/06* (2013.01); *G07C 2009/00325* (2013.01); *G07C 2009/00412* (2013.01)

(58) Field of Classification Search
  CPC ............ G07C 9/00912; G07C 9/00015; G07C 9/00309; G07C 2009/00412; G07C 2009/00325; G06Q 20/40; G06Q 20/3829; H04W 12/06; H04L 63/0428
  See application file for complete search history.

(56) References Cited

U.S. PATENT DOCUMENTS

| 4,602,150 | A | * | 7/1986 | Nishikawa | ............ | E05B 17/142 235/382 |
| 8,479,982 | B1 | | 7/2013 | Gromley et al. | | |
| 8,537,010 | B2 | * | 9/2013 | Hamm | ...................... | E05G 1/08 109/1 S |
| 8,682,245 | B2 | * | 3/2014 | Fyke | .................. | G07C 9/00015 455/41.1 |

(Continued)

*Primary Examiner* — Brian Miller
(74) *Attorney, Agent, or Firm* — Meyertons, Hood, Kivlin, Kowert & Goetzel, P.C.

(57) ABSTRACT

Techniques are disclosed relating to securing physical compartments and allowing users access via a mobile device configured to use a mobile authentication system. In some embodiments, a locking device for a physical container is configured to unlock only if both a transaction authentication system confirms successful authentication of a mobile device and an auxiliary key is present. The locking device may receive encrypted data from the mobile device via a short-range wireless connection, transmit the data to the transaction authentication system, and receive a message indicating whether authentication was successful. The mobile device may encrypt the data using a replenishment key from the transaction authentication system; therefore the authentication may decrypt the received encrypted data to confirm an identity of the mobile device. In some embodiments, disclosed techniques may allow users to use their mobile device to unlock a safety deposit box without requiring extensive infrastructure investment, e.g., because the existing authentication network may be utilized.

20 Claims, 6 Drawing Sheets

(56) References Cited

U.S. PATENT DOCUMENTS

| | | | | |
|---|---|---|---|---|
| 8,720,239 | B2* | 5/2014 | Crass | B25H 3/028 |
| | | | | 70/256 |
| 9,070,233 | B2* | 6/2015 | Dowling | G07C 9/00031 |
| 9,269,207 | B2* | 2/2016 | Fyke | G07C 9/00015 |
| 9,367,975 | B2* | 6/2016 | Robertson | G07C 9/00571 |
| 9,442,466 | B2* | 9/2016 | Gilbertson | G05B 1/01 |
| 9,542,784 | B2* | 1/2017 | O'Toole | G07C 9/00182 |
| 9,600,949 | B2* | 3/2017 | Conrad | G07C 9/00571 |
| 2006/0181392 | A1 | 8/2006 | Watson | |
| 2007/0256615 | A1* | 11/2007 | Delgrosso | E05G 1/08 |
| | | | | 109/38 |
| 2012/0239928 | A1* | 9/2012 | Judell | H04L 9/30 |
| | | | | 713/168 |
| 2013/0342314 | A1* | 12/2013 | Chen | G07C 9/00309 |
| | | | | 340/5.65 |
| 2014/0068247 | A1* | 3/2014 | Davis | B60R 25/24 |
| | | | | 713/155 |
| 2014/0223573 | A1* | 8/2014 | Reedy | G06F 21/6218 |
| | | | | 726/26 |
| 2016/0036814 | A1* | 2/2016 | Conrad | H04L 63/0876 |
| | | | | 713/171 |
| 2016/0269168 | A1* | 9/2016 | Carstens | A47G 29/141 |
| 2016/0277439 | A1* | 9/2016 | Rotter | H04L 63/0861 |
| 2016/0364704 | A1* | 12/2016 | Salgado | G06Q 20/32 |
| 2017/0069148 | A1* | 3/2017 | Gilbertson | G07C 9/00087 |
| 2017/0236353 | A1* | 8/2017 | Conrad | G07C 9/00571 |
| 2017/0237736 | A1* | 8/2017 | Eber | H04L 63/10 |

* cited by examiner

CONTROLLING ACCESS TO PHYSICAL COMPARTMENT USING MOBILE DEVICE AND TRANSACTION AUTHENTICATION SYSTEM

BACKGROUND

Technical Field

This disclosure relates generally to securing physical compartments and more particularly to access control using a mobile device and transaction authentication system.

Description of the Related Art

Institutions such as banks often provide lockers or safety deposit boxes for storing customers' items. Traditionally, a locking mechanism for such a locker opens when two keys are present; one key is given to the customer and another kept by the bank. Thus, the bank cannot access the locker without the customer's key and the customer requires assistance from the bank to access the locker.

As mobile devices become more common, they may replace various traditional items such as payment instruments (e.g., credit cards). Some mobile devices have a mobile wallet application installed that allows them to make payments, e.g., via short-range wireless communications with a point-of-sale device.

Figure 1:
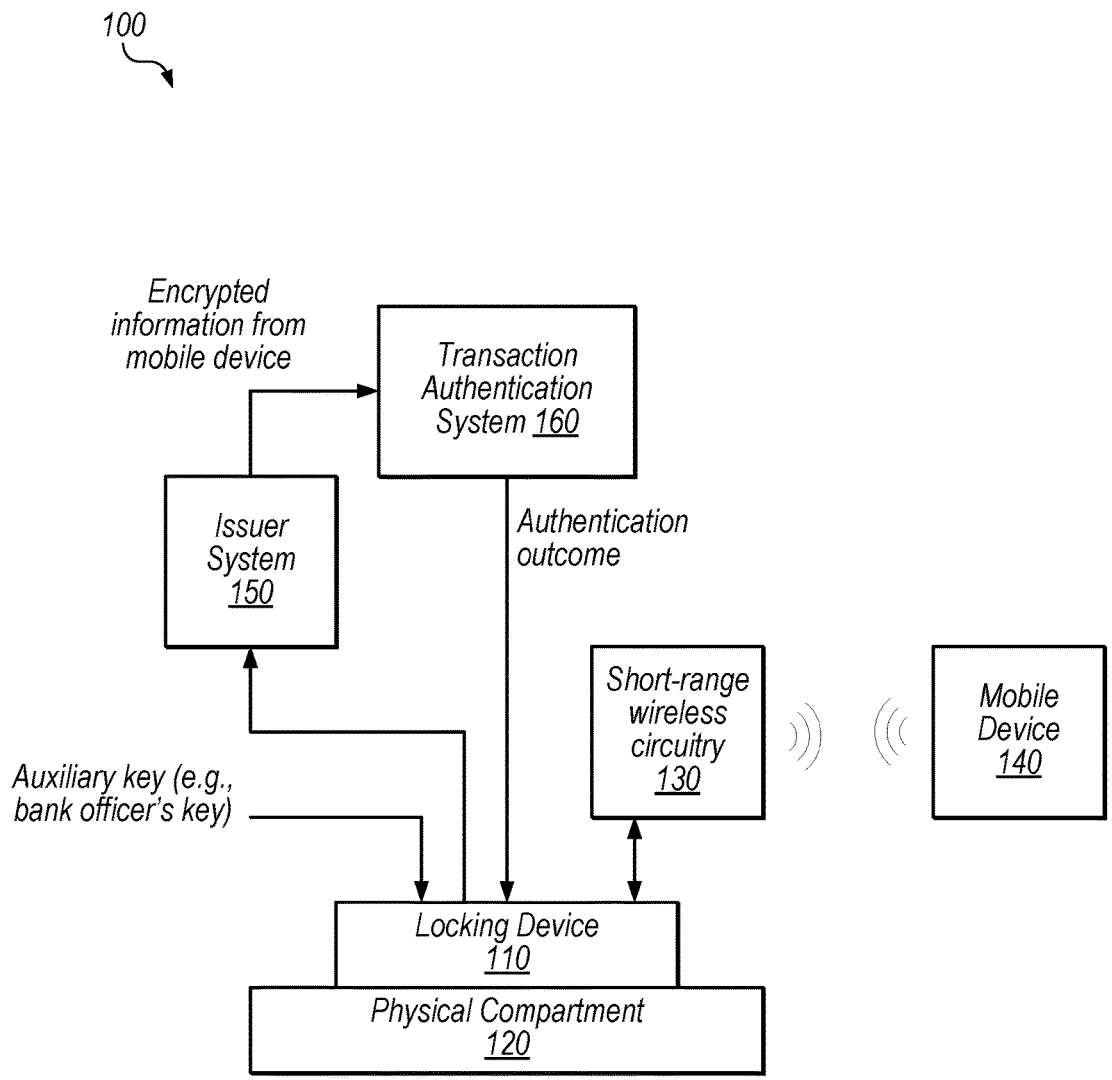
FIG. 1 is a block diagram illustrating a system for controlling a locking device for a physical compartment, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to encrypt information using an encryption key" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Exemplary System

FIG. 1 is a block diagram illustrating an exemplary environment 100 that includes a locking device 110, a physical compartment 120, short-range wireless circuitry 130, a mobile device 140, an issuer system 150, and a transaction authentication system 160.

Locking device 110, in some embodiments, is configured to prevent access to physical compartment 120 in a locked configuration and to allow access to physical compartment 120 in an unlocked configuration. In some embodiments, locking device 110 includes or is coupled to a computing device configured to control locking device 110 to have a desired configuration. Any of various types of physical portions of locking device 110 may be implemented.

Physical compartment 120, in some embodiments, is a bank vault, locker, or safety deposit box. In other embodiments, physical compartment 120 may be a larger compartment such as a room or a building. In some embodiments, physical compartment 120 is constructed to be difficult to open without a specified set of one or more keys. For example, the physical compartment may have walls constructed of strong materials, multiple locking points, etc. Effectiveness in preventing illicit entry may be classified, e.g., with different underwriter laboratories (UL) types or classes which may roughly indicate expected times to break open the physical compartment without a key.

Short-range wireless circuitry 130 is configured to communicate with nearby devices within a limited range, e.g., 3, 10, 20, or 50 meters in some embodiments. Short-range wireless circuitry 130 may be configured to communicate using a particular standard such as near field communications (NFC), WiFi Direct, or Bluetooth, for example. In some embodiments, short-range wireless circuitry 130 is included in a device similar to devices uses for point-of-sale, e.g., for payments using mobile devices. The device may require mobile device 140 to be bumped with the device or otherwise in contact with the device in order to communicate.

Mobile device 140, in the illustrated embodiment, is configured to communicate with short-range wireless circuitry 130 in order to access physical compartment 120, in conjunction with an auxiliary key (e.g., a bank officer's key). In some embodiments, the auxiliary key is a physical key. In other embodiments, the auxiliary key is a cryptographic key, such that similar techniques may be used for the auxiliary key as are used for mobile device 140, as discussed in further detail below. Further, the auxiliary key may be a password or may be a combination (e.g., for a combination lock) in other embodiments.

In some embodiments, mobile device 140 is configured to encrypt information using a cryptographic key (e.g., a replenishment key) provided by transaction authentication system 160. Replenishment keys may be provided to the device at intervals based on replenishment logic in order to prevent unauthorized replication of the keys. In some embodiments, short-range wireless circuitry 130 and/or locking device 110 may send the encrypted information to the transaction authentication system 160 and receive an authentication outcome which may be used as a primary key to access the physical compartment, in conjunction with the auxiliary key. For example, if the authentication outcome is positive and the auxiliary key is also present, the locking device may unlock. As another example, if the auxiliary key is a cryptographic key which also requires authentication, locking device 110 may be configured to unlock if both the auxiliary key and the primary key are authenticated within a particular time interval, e.g., within 30 seconds of each other. The physical locking mechanisms the primary and auxiliary key may be separate or may be shared. For example, the keys may have separate locking bars corresponding to each key or may both be required to open the same locking bar.

In some embodiments, the mobile device 140 is configured to encrypt at least a portion of payment account information, and an unencrypted part (e.g., a routing number) may be used by locking device 110 to route the information to issuer computer system 150, which may then send the encrypted information to transaction authentication system 160. Issuer system 150 may be maintained by an entity that issues payment accounts and payment instruments, for example. In some embodiments, issuer system 150 is maintained by an entity that provides a mobile wallet application for installation on mobile device 140.

Transaction authentication system 160, in some embodiments, is configured to decrypt the information from mobile device 140, e.g., using a private key and/or based on knowledge of the replenishment key used by mobile device 140. For example, the transaction authentication system 160 may encrypt account data for the user using one or more keys known to have been provisioned to mobile device 140 and determine whether the encrypted account data matches the encrypted data from mobile device 140. A match may authenticate mobile device 140.

In some embodiments, issuer system 150 may be omitted. Further, in some embodiments, short-range wireless circuitry 130 may be included in a device that is configured to send the encrypted information, rather than this information being sent by locking device 110. In these embodiments, the device that includes short-range wireless circuitry 130 may be configured to control locking device 110, which may not include processing capability.

In some embodiments, issuer system 150 and transaction authentication system 160 are configured to process the transaction as if it were a normal purchase transaction (e.g., for a zero purchase price or for a small amount of money that may be refunded). Said another way, these elements may not be aware that the authentication is being performed for physical access (as opposed to some traditional purpose). Therefore, traditional authentication techniques may be used, which may avoid a need to build new infrastructure to provide limited access to physical compartment 120 using mobile device 140.

Exemplary Methods

Figure 2A:
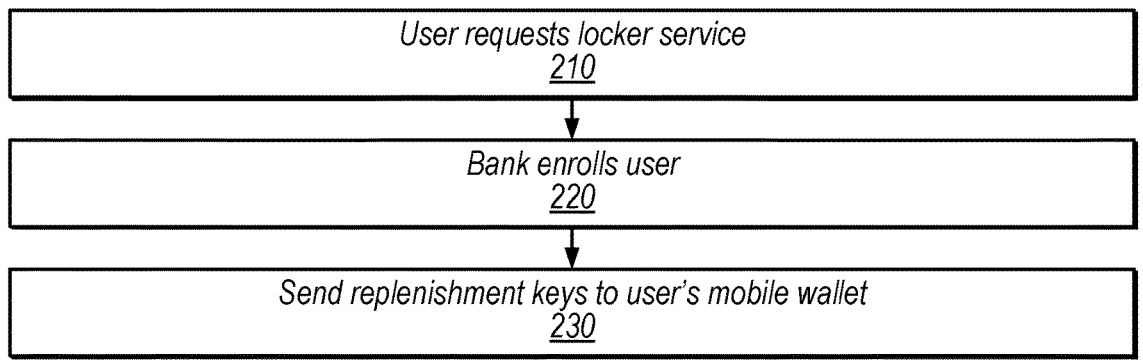
FIG. 2A is a flow diagram illustrating an exemplary method for enrolling a user for a locker service, according to some embodiments.

FIG. 2A is a flow diagram illustrating a method 200 for enrolling a user in a locker service, according to some embodiments. The method shown in FIG. 2A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 210, in the illustrated embodiment, a user requests a locker from a bank. The user may request via mobile device 140 or via some other method such as in-person via a customer service representative, via a web site, etc. The user may provide account information and/or information identifying mobile device 140 so that the bank can recognize mobile device 140 in the future.

At 220, in the illustrated embodiment, the bank enrolls the user. This may include assigning a physical compartment 120 to the user and configuring a corresponding locking device 110 and/or short-range wireless circuitry 130 to recognize the user (e.g., based on login credentials), recognize mobile device 140 based on hardware characteristics such as a MAC address, etc.

At 230, in the illustrated embodiment, an authentication system sends replenishment keys to the user's mobile wallet. In some embodiments, the replenishment keys are tracked as being specifically for use in accessing a physical compartment. In other embodiments, the replenishment keys are traditional processed, such that the authentication system has no knowledge of how the keys are used. Mobile device 140 may store the authentication keys in secure memory.

Figure 2B:
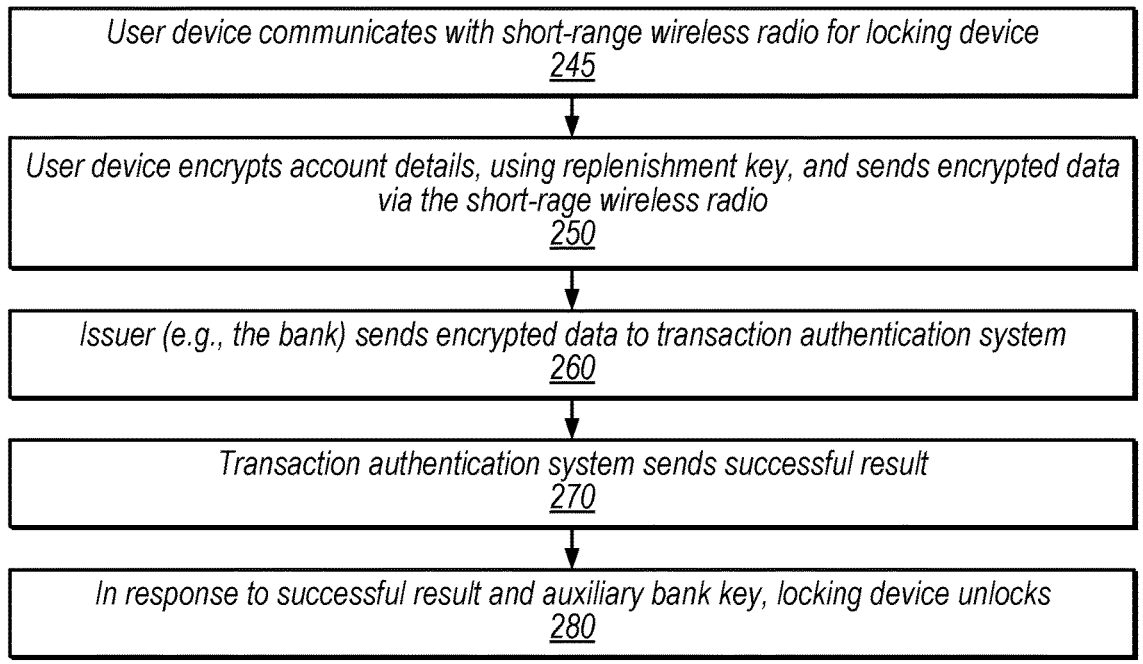
FIG. 2B is a flow diagram illustrating an exemplary method for unlocking the locking device, according to some embodiments.

FIG. 2B is a flow diagram illustrating a method 240 for unlocking a locking device, according to some embodiments. The method shown in FIG. 2B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 245, in the illustrated embodiment a user device (e.g., mobile device 140) communicates with a short-range wireless radio for a locking device. As discussed above, various appropriate communication standards may be used. The user device may be required to be very near the short-range-wireless radio (e.g., by touching the user device to a terminal) in order to communicate.

At 250, in the illustrated embodiment, the user device encrypts account details using a replenishment key and sends the encrypted data via the short-range wireless radio.

At 260, in the illustrated embodiment, the issuer of the account sends encrypted data to a transaction authentication system. In some embodiments, the issuer is the bank that controls the physical compartment being accessed.

At 270, in the illustrated embodiment, the transaction authentication system sends a successful result message (e.g., based on decrypting the encrypted data and determining that the decrypted data matches an expected result).

At 280, in the illustrated embodiment, the locking device unlocks in response to both the successful result from the transaction authentication system and confirmation of the auxiliary bank key.

In some embodiments, the locking device is configured to remain unlocked for a time interval (which may be programmable) after being unlocked and then revert to the locked configuration.

Figure 3:
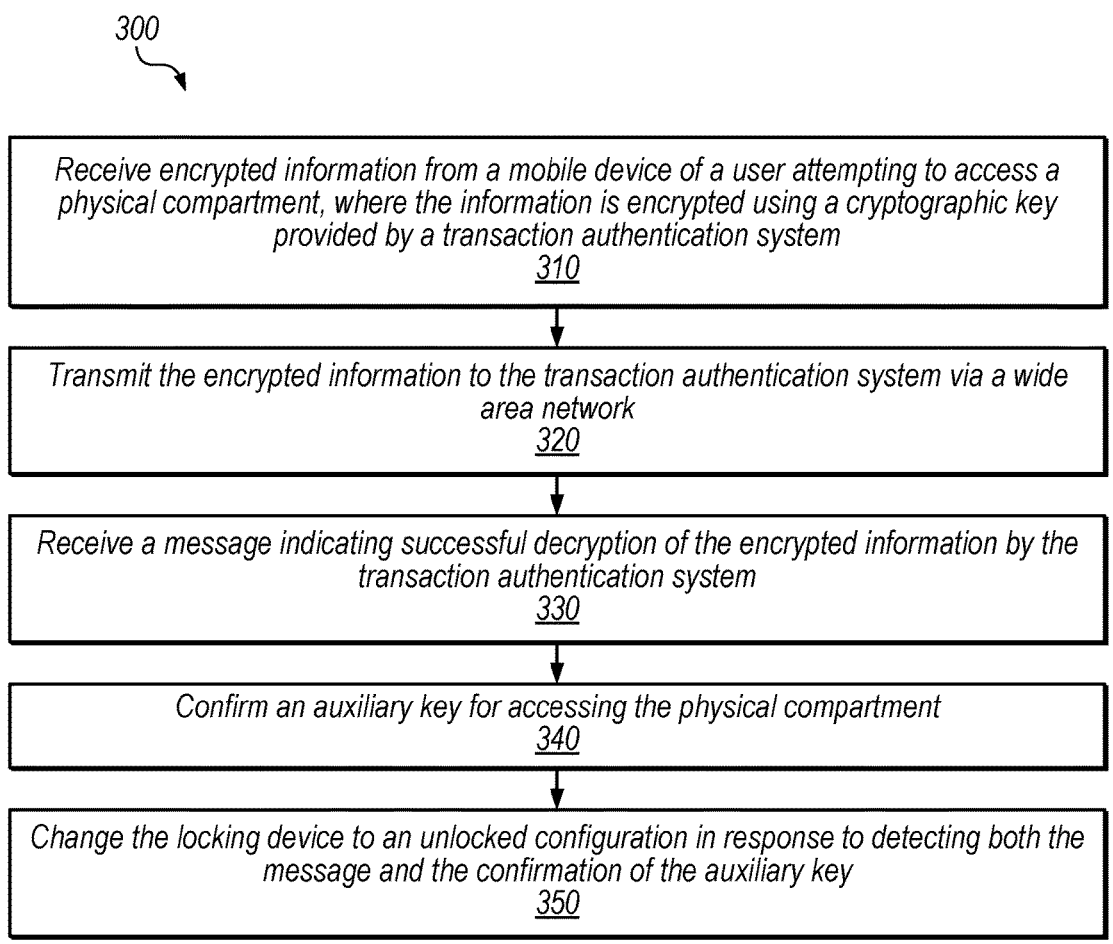
FIG. 3 is a flow diagram illustrating another exemplary method unlocking the locking device, according to some embodiments.

FIG. 3 is a flow diagram illustrating a method 300 for unlocking a physical compartment based on communication with a mobile device, according to some embodiments. The method shown in FIG. 3 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 310, in the illustrated embodiment, a computing device receives encrypted information from a mobile device of a user attempting to access a physical compartment. In the illustrated embodiment, the information is encrypted using a cryptographic key provided by a transaction authentication system. The information may be received via a short-range wireless communication. The short-range wireless radio may be located near the physical compartment being accessed. In some embodiments, the transaction authentication system is also configured to authorize transactions, e.g., payment transactions. In some embodiments, the computing device and/or the short-range radio are coupled to or included in a locking device.

At 320, in the illustrated embodiment, the computing device transmits the encrypted information to the transaction authentication system via a wide area network, such as the Internet or a dedicated payment network, for example.

At 330, in the illustrated embodiment, the computing device receives a message indicating successful decryption of the encrypted information by the transaction authentication system. The message may be used to confirm that the mobile device operates using an account of a user allowed to access the physical compartment.

At 340, in the illustrated embodiment, the computing device confirms an auxiliary key for accessing the physical compartment. In some embodiments, this is performed mechanically, e.g., based on a physical key being entered into a lock and turned. In other embodiments, the auxiliary key is cryptographic and may require a bank officer to hold a mobile device that stores the cryptographic auxiliary key near the short-range wireless radio.

At 350, in the illustrated embodiment, the computing device changes the locking device to an unlocked configuration in response to detecting both the message and the confirmation of the auxiliary key.

Access Control Examples

Figure 4:
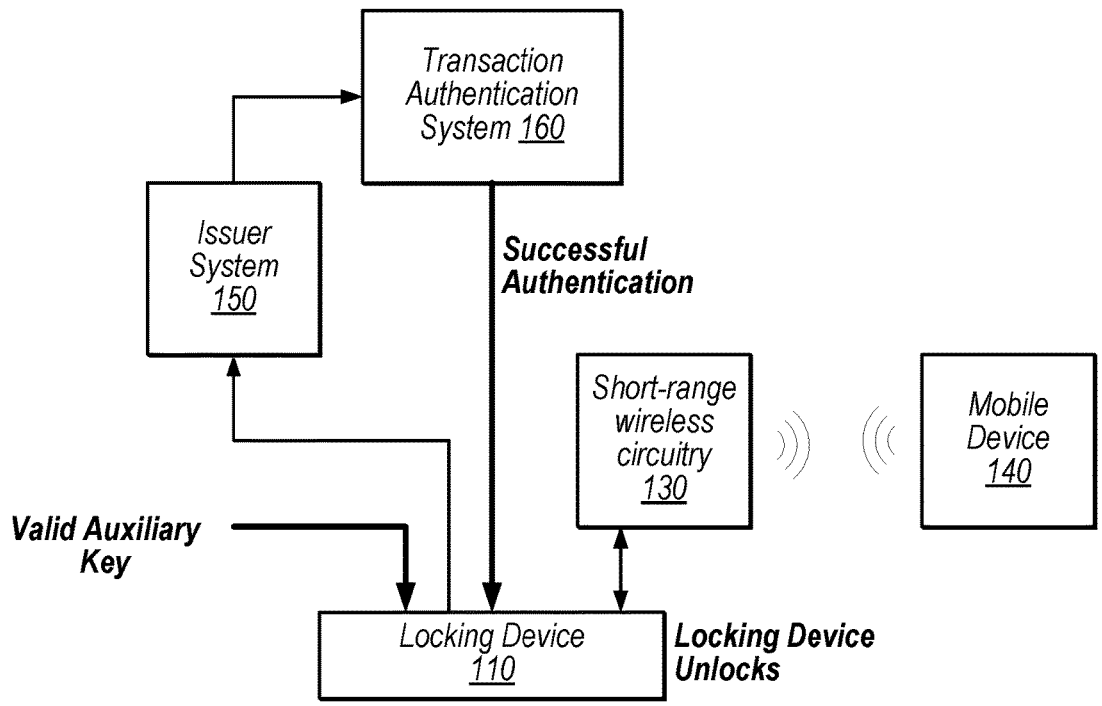
FIG. 4 is a block diagram illustrating an exemplary successful unlock situation, according to some embodiments.
Figure 5:
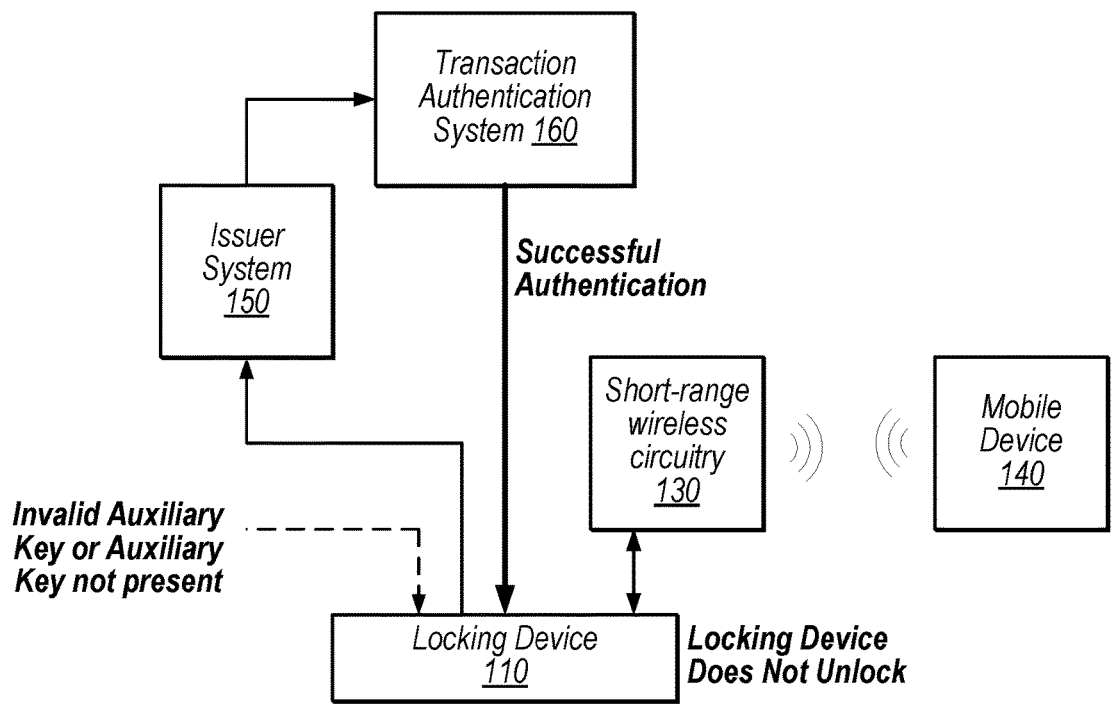
FIG. 5 is a block diagram illustrating an exemplary unsuccessful situation where an auxiliary key is invalid or not present, according to some embodiments.
Figure 6:
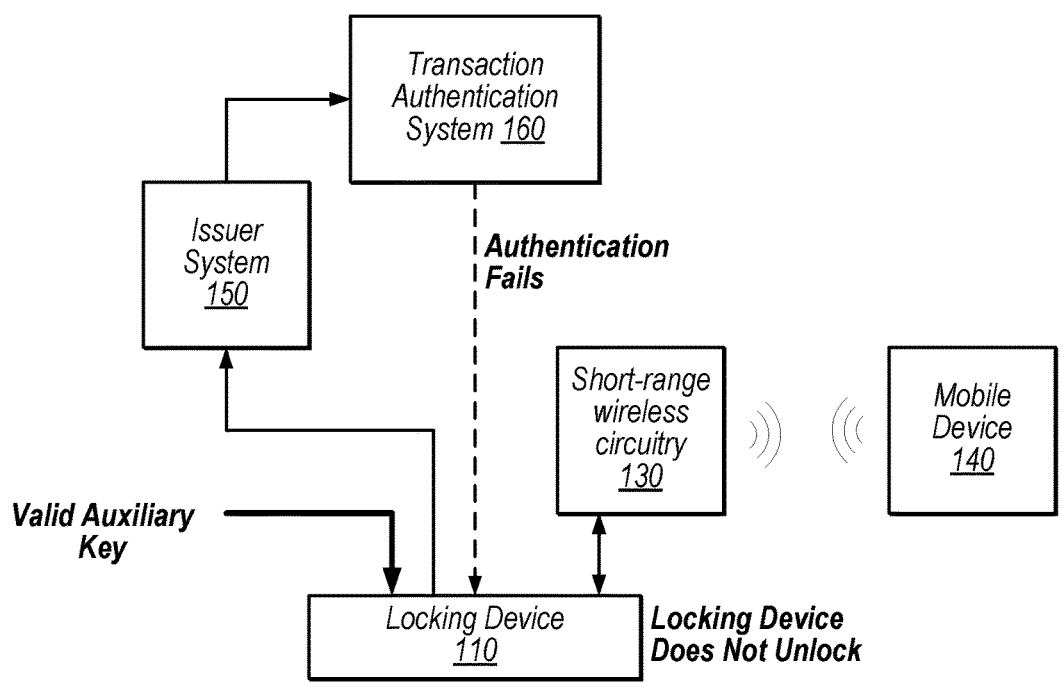
FIG. 6 is a block diagram illustrating an exemplary unsuccessful situation where the mobile device is not authenticated, according to some embodiments.

FIGS. 4-6 illustrate exemplary situations where access to physical compartment 120 is granted or denied. In FIG. 4, a valid auxiliary key is detected and transaction authentication system 160 indicates that authentication of mobile device 140 was successful. In response, locking device 110 unlocks and allows access to physical compartment 120 (not shown). Locking device 110 may include one or more thresholds (which may be programmable) for time proximity in which the auxiliary key and the successful authentication message much be confirmed, e.g., to prevent access by the bank long after the user attempts to unlock. Therefore, the computing device may be configured to check that the successful authentication and detection of the auxiliary key occurred within the appropriate threshold time interval.

In FIG. 5, an invalid auxiliary key is presented or the auxiliary key is not present. As shown, in this situation, locking device does not unlock, and continues to prevent access to the physical compartment 120. Similarly, in FIG. 6, even though a valid auxiliary key is presented, transaction authentication system 160 indicates that authentication fails and locking device 110 prevents access to the physical compartment.

In some embodiments, any of various operations discussed herein may be performed by executing program instructions stored on a non-transitory computer readable medium. Such program instructions may be executed by any of the computing devices discussed herein, for example. In these embodiments, the non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Exemplary Device

Figure 7:
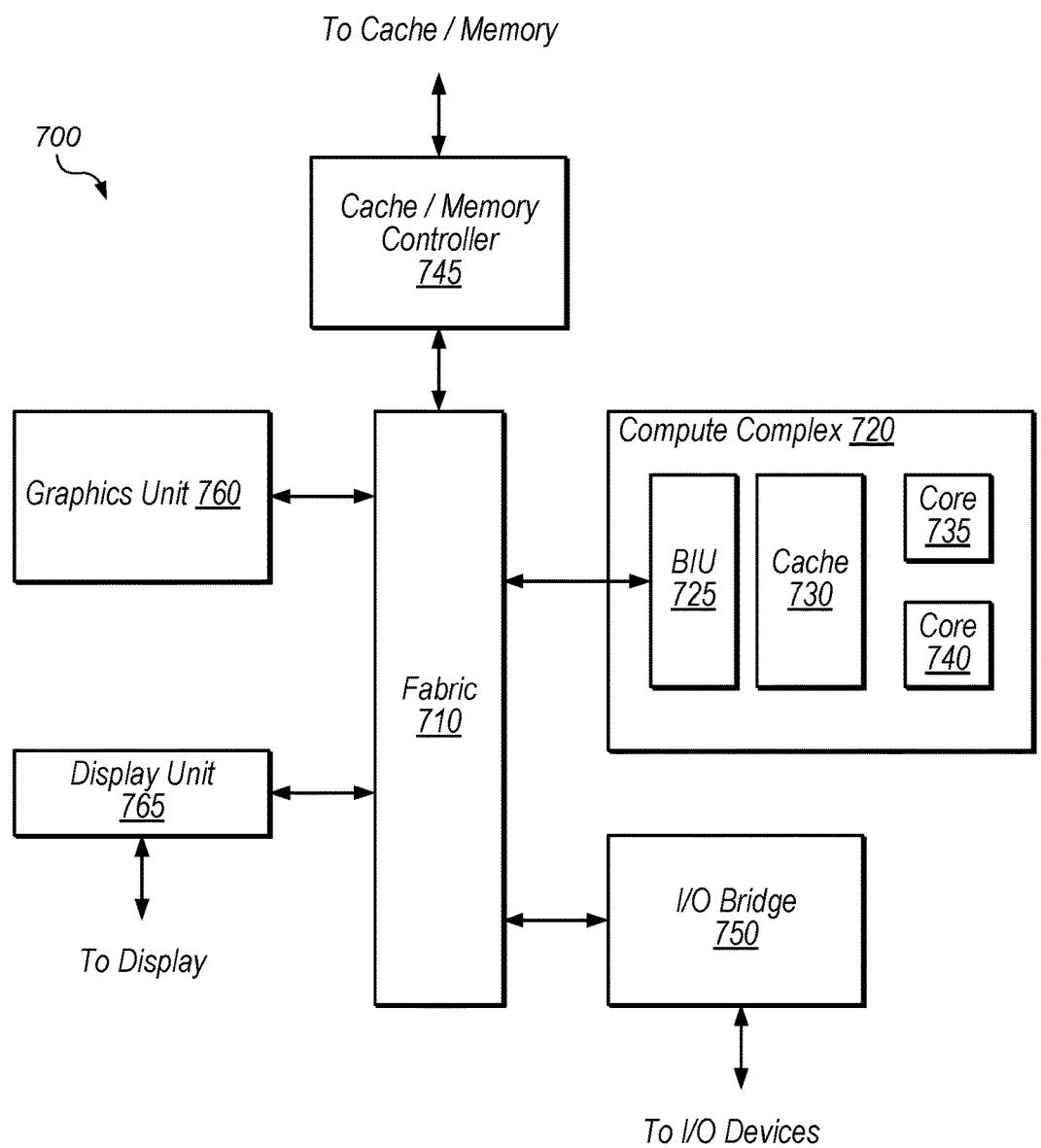
FIG. 7 is a block diagram illustrating one embodiment of a computing device.

Referring now to FIG. 7, a block diagram illustrating an exemplary embodiment of a device 700 is shown. The illustrated processing elements may be included in elements 110, 130, 140, 150, and/or 160, in some embodiments. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720, input/output (I/O) bridge 750, cache/memory controller 745, graphics unit 760, and display unit 765.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 760 may be described as "coupled to" a memory through fabric 710 and cache/memory controller 745. In contrast, in the illustrated embodiment of FIG. 7, graphics unit 760 is "directly coupled" to fabric 710 because there are no intervening elements.

Graphics unit 780 may include one or more processors and/or one or more graphics processing units (GPU's). Graphics unit 780 may receive graphics-oriented instructions, such as OPENGL® or DIRECT3D® instructions, for example. Graphics unit 780 may execute specialized GPU instructions or perform other operations based on the received graphics-oriented instructions. Graphics unit 780 may generally be configured to process large blocks of data in parallel and may build images in a frame buffer for output to a display. Graphics unit 780 may include transform, lighting, triangle, and/or rendering engines in one or more graphics processing pipelines. Graphics unit 780 may output pixel information for display images.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a locking device configured to prevent access to a physical compartment in a first configuration and to allow access to the physical compartment in a second configuration;
   short-range wireless circuitry configured to wirelessly receive encrypted information from a mobile device of a user attempting to access the physical compartment, wherein the encrypted information is encrypted using a cryptographic key provided to the mobile device by a transaction authentication system;
   wherein the apparatus is configured to:
      transmit the encrypted information to the transaction authentication system via a wide area network;
      receive a message from the transaction authentication system that indicates that decryption of the encrypted information resulted in a match with stored information associated with a user of the mobile device;
      confirm an auxiliary key for accessing the physical compartment; and
      in response to detecting both the message and the confirmation of the auxiliary key, change the locking device from the first configuration to the second configuration.

2. The apparatus of claim 1, wherein the physical compartment is a bank locker.

3. The apparatus of claim 1, wherein the cryptographic key is a replenishment key.

4. The apparatus of claim 1, wherein the auxiliary key is a second cryptographic key and wherein the apparatus is configured to transmit second information encrypted using the second cryptographic key to the transaction authentication system via the wide area network and confirm the auxiliary key based on a second message from the transaction authentication system that indicates successful decryption of the transmitted second information.

5. The apparatus of claim 1, wherein the auxiliary key is a physical key to the locking device.

6. The apparatus of claim 1, wherein the auxiliary key is a near field communications (NFC) device.

7. The apparatus of claim 1, wherein the encrypted information is payment account information for a payment account associated with the transaction authentication system.

8. A method, comprising:
   receiving, by a computing system via short-range wireless circuitry, encrypted information from a mobile device of a user attempting to access a physical compartment, wherein the encrypted information is encrypted using a cryptographic key provided to the mobile device by a transaction authentication system;

transmitting, by the computing system, the encrypted information to the transaction authentication system via a wide area network;

receiving, by the computing system, a message from the transaction authentication system that indicates that decryption of the encrypted information resulted in a match with stored information associated with a user of the mobile device; and generating, by the computing system, an unlock signal that is usable by a locking device, in combination with an auxiliary key, to allow access to the physical compartment.

9. The method of claim 8, wherein the physical compartment is a safety deposit box.

10. The method of claim 8, wherein the cryptographic key is a replenishment key.

11. The method of claim 8, wherein the auxiliary key is a second cryptographic key.

12. The method of claim 8, wherein the auxiliary key is a physical key.

13. The method of claim 8, wherein the encrypted information is payment account information for a payment account associated with the transaction authentication system.

14. The method of claim 8, further comprising registering an account of the user with the locking device and verifying the account of the user prior to generating the unlock signal.

15. A non-transitory computer-readable medium having instructions stored thereon that are executable by a mobile device to perform operations comprising:

storing a cryptographic key received from a transaction authorization system;

encrypting information using the cryptographic key;

transmitting the encrypted information, via short-range wireless circuitry to a computing device that controls access to a physical compartment, wherein the encrypted information is usable by the computing device to transmit the encrypted information to the transaction authorization system and receive a message that indicates that decryption of the encrypted information results in a match;

receiving an access control decision from the computing device that indicates whether access to the physical compartment has been granted; and displaying an indication of the access control decision.

16. The non-transitory computer-readable medium of claim 15, wherein the cryptographic key is a replenishment key.

17. The non-transitory computer-readable medium of claim 15, wherein the access control decision is further based on confirmation of an auxiliary key.

18. The non-transitory computer-readable medium of claim 17, wherein the auxiliary key is based on communications by the computing device with a second mobile device.

19. The non-transitory computer-readable medium of claim 15, wherein the short-range wireless circuitry uses near field communications (NFC).

20. The non-transitory computer-readable medium of claim 15, wherein the short-range wireless circuitry uses one of Bluetooth and WiFi Direct.

* * * * *